Feb. 9, 1943.   E. R. DILLEHAY   2,310,619
MANUFACTURE OF HARD RUBBER PANELS
Filed Dec. 15, 1939
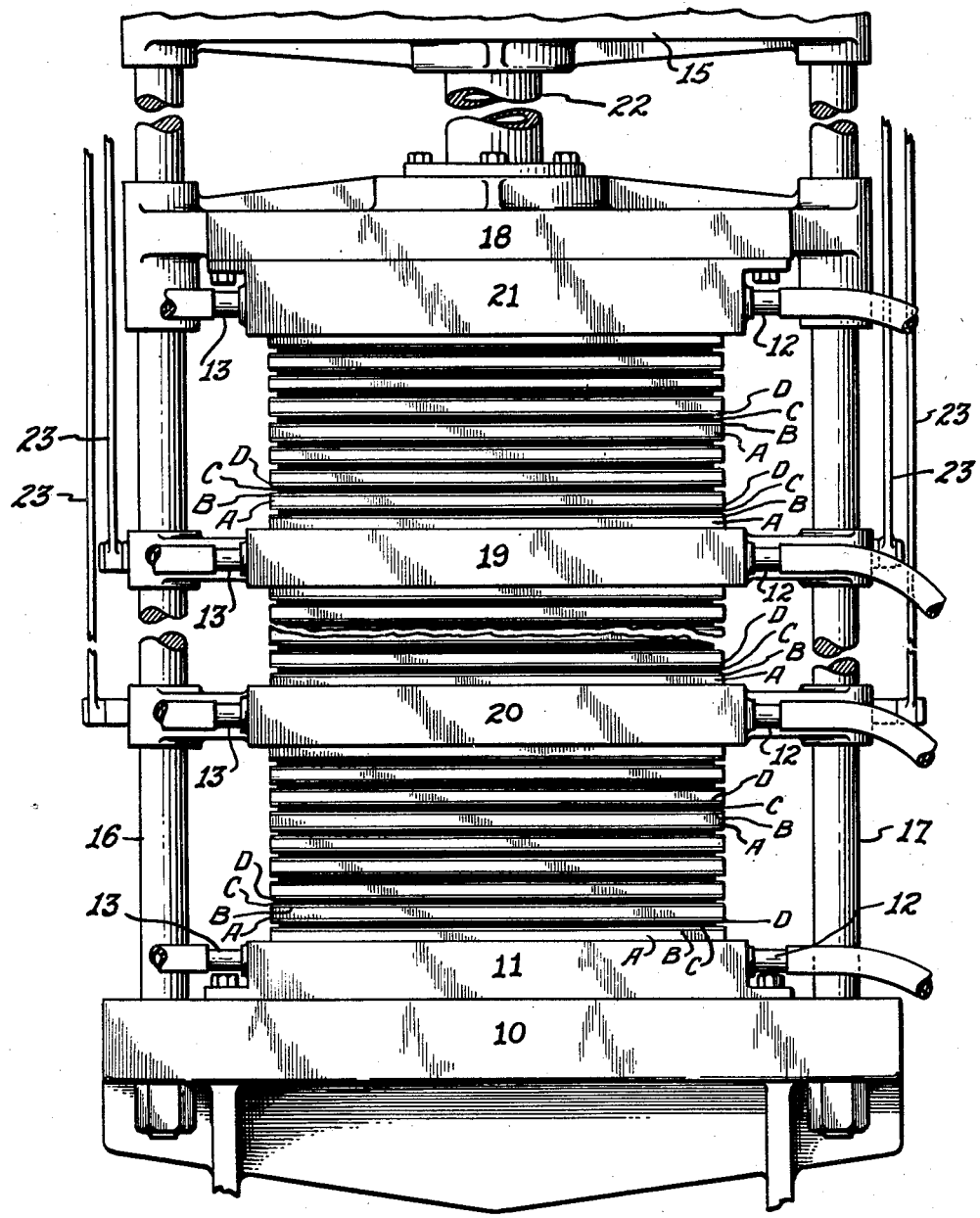
INVENTOR.
EDWARD R. DILLEHAY.
BY Allen & Allen
ATTORNEYS.

Patented Feb. 9, 1943

2,310,619

UNITED STATES PATENT OFFICE 2,310,619

MANUFACTURE OF HARD RUBBER PANELS

Edward R. Dillehay, Glen Ellyn, Ill., assignor to The Richardson Company, Lockland, Ohio, a corporation of Ohio Application December 15, 1939, Serial No. 309,422

5 Claims. (Cl. 18—53)

My invention relates to the manufacture of sheet stock or panels from high grade hard or semi-hard rubber. Such sheet stock and panels find use in electrical insulation and other arts. As compared with laminated resinous materials a high grade rubber insulating material is superior for low loss electrical insulation. One reason for this is that the rubber does not absorb water to any measurable extent so that the resistance of the insulation is equally as good under humid conditions as under dry conditions. Another reason is that the power factor of high grade rubber is around 1% as compared with 3% for the best grade of laminated resinous stock. In spite of the fact that rubber has the disadvantage of greater cold flow at elevated temperatures and further that it tends to corrode silver plated lugs which may be anchored into various punched parts, there has been and will continue to be a distinct field for the application of rubber.

Hitherto the manufacture of rubber stock of this character has involved a number of serious difficulties and problems none of which were perfectly solved. It is a fundamental object of my invention to provide a means and method for the manufacture of this stock wherein the said problems are solved as will hereinafter appear, and further to provide an improved product, and a new control of manufacturing operations and product characteristics.

In the conventional method of manufacture, the compounded rubber sheet stock is run out to the proper thickness on an ordinary calendar through which the rubber is passed together with a sheet of tin. The rubber stock adheres to the tin on one side. The excess material is trimmed away around the edges of the tin sheet, and another sheet of tin is rolled onto the top side of the rubber by a hand operation. The tin must be applied smoothly, taking care to avoid air pockets; and it must be made to stick uniformly all over the rubber sheet. It is a very difficult operation to roll the tin onto the rubber properly; and it is often necessary to wet the surface of the rubber with gasoline or other solvent in order to get good adhesion, and then roll the tin down with a heavy steel roller under considerable pressure. After the assemblies are prepared as described, they are stacked and placed in a shallow pan so that the whole pile can be covered with water. The pan is placed in a steam vulcanizer, and the water covered, stacked assemblies, are cured for several hours under a steam pressure which may be varied from 10 to 100 pounds per square inch according to the thickness and grade of rubber being processed. It will be observed that this is not a molding procedure and that no pressure is applied to the rubber sheets other than the relatively slight pressure exerted by the steam in the closed vulcanizer.

When the cure of the rubber is complete the material is removed from the vulcanizer and the sheets of tin are stripped away from the rubber. Much trouble is experienced from the tin coming loose from the sheet during vulcanization, or being imperfectly adhered to the rubber at the outset. Pock marks and rough spots are caused in this manner so that a comparatively large portion of the stock must be rejected.

Another serious disadvantage of this procedure is that the tin sheets cannot be used again. The tin must be melted and rerolled through a conventional tin mill. This necessitates the operation of melting, casting and tin mill equipment along with rubber equipment. The tin rolling equipment especially is very expensive, so that the capital outlay for this manufacturing procedure is excessive.

It is an object of my invention to provide a mode of operation and a means which eliminates all of the disadvantages set forth above. It is an object of my invention to provide a way of manufacturing rubber panels and sheet stock comparable to that practiced with laminated resinous articles. It is an object of my invention to provide a mode of manufacture involving less expensive equipment, and a mode of manufacture which is more certain in that it gives fewer defective sheets.

These and other objects of my invention which will be set forth hereinafter or will be apparent to one skilled in the art upon reading these specifications, I accomplish by that certain procedure and through the use of that apparatus of which I shall now describe a preferred embodiment.

An advantage of my procedure is that it permits the use of high pressure in a press. This has not been possible hitherto with rubber sheet stock of the character to which this invention is addressed for several reasons. No one has hitherto solved the problem of a suitable pressure pan against which to mold the rubber and further there has been no way hitherto of keeping the rubber stock within the press and between the molding pans. This difficulty is not encountered with resinous molding stocks of laminated character for the reason that the laminae of paper or fabric hold the material between the pressure pans. Another advantage of my procedure is that it eliminates a cure under water and eliminates the use of pressure vulcanizers of the sealed chamber type. Still another advantage of my procedure is that metal pressing pans may be used over and over again without intermediate treatment so that the expense of using and preparing fresh sheet tin for each panel is eliminated entirely. Still another advantage of my procedure is that a better product is produced. My product has a very high finish and is not subject to pock marks and rough places if no more than ordinary manufacturing care is applied.

In my procedure the rubber is first compounded and then is rolled out to the proper thickness on a calendar but without the use of any metal sheet stock. The rubber stock so sheeted may be used at once, or if it is necessary to store it, it may be placed in a treated liner, as known in the art, to prevent sticking, until it is ready to be used. It is then cut to the proper size and is laid up between Cellophane sheets on regular stainless steel pressure pans such as are used in the manufacture of laminated resinous stocks.

My drawing is a fragmentary front elevation of a suitable press, but having parts broken away and being semi-diagrammatic in character, the proportionate thicknesses of the Cellophane sheets, the pressure pans and the rubber stock being exaggerated to more clearly illustrate the arrangement thereof.

As shown, the bed or platen 10 of the press is provided with a heating element 11. Extending upward from the bed 10 so as to support the head 15 of the press are suitable side members which, in the arrangement shown, comprise tension rods 16 and 17, which rods also serve as guide means for the upper platen or ram 18 and for the intermediate platens or heating elements 19 and 20 of the press. The platens 18, 19 and 20 have suitable slidable mountings on the rods.

The heating elements 11, 19, 20 and 21 have suitable internal passageways for circulation of the heating and cooling fluids and are supplied therewith through inlets and outlets respectively indicated at 12 and 13.

The ram 18 may be activated by the piston rod 22 of an hydraulic cylinder, which cylinder is not shown but will be incorporated within the head 15.

The various platens are shown in the positions occupied during the pressure cycle, and during the loading or unloading cycle the platens 19 and 20 may be lifted to provide suitable working clearance by any convenient means operable through links or levers generally indicated at 23.

As shown in the drawing, I first lay down a stainless steel pressing pan A on a work table or the platen of a press and on this I place a sheet of Cellophane B. While I use the term "Cellophane" herein, I desire to point out that I have found it possible to use for the purpose described any of the films of regenerated cellulosic materials now on the market under various trade names of which Cellophane is one. On the sheet of Cellophane B I next lay a sheet of the rubber stock C which has been cut to size. On this I place another sheet of Cellophane D. In laying the sheeted rubber onto the first Cellophane sheet, care must be taken to avoid wrinkling of the Cellophane since there will be some adhesion as soon as the rubber touches the Cellophane. With a little practice, however, workmen readily get the knack of laying the rubber down on the Cellophane. While it would be possible to place a Cellophane sheet on each side of a sheet of rubber before the composite thus formed is assembled to the press pan, I do not prefer this procedure. When the rubber has been covered with Cellophane, another stainless steel pressing pan A is laid on top of the Cellophane, then another piece of Cellophane B, another piece of rubber C, another piece of Cellophane D, and so on until the stack is complete. I prefer to assemble the stack in the press although if desired it may be assembled elsewhere and transferred to the press. I usually press about eight $\frac{1}{16}$" rubber sheets in a stack between platens, as is the practice in conventional resin laminating procedure, or their equivalent in sheets of other thickness.

I have mentioned stainless steel pressing pans because these are current in the resin molding industry. Other metallic pressing pans may of course be used, because the rubber material never comes in contact with the pressing faces thereof and the qualities and characteristics of the pans are not changed nor are the pans in any way damaged. For example, the usual stainless steel pressing pans may be used alternatively for the manufacture of laminated resinous stocks and for the manufacture of rubber panels. Whatever the character of molding pan employed, if a high polish is desired on the panels the pan should be quite smooth; but it is not without the spirit of my invention to employ pans having rough or configured surfaces where a textured surface is desired on the rubber panel. Unless the configurations are too deep, there is enough stretchability in the Cellophane or other regenerated cellulosic material to follow the contours of a textured plate.

The stack is pressed under hydraulic pressure of from 100 to 1000 pounds per square inch. During the pressure cycle I employ a steam pressure of from 10 to 100 pounds per square inch for a time cycle which will vary according to the thickness of the sheets being pressed. The curing time for eight $\frac{1}{16}$" sheets is usually two hours at 100 pounds steam pressure.

The material preferably is cooled while still in the press to facilitate the handling of the heavy plate; and then the load is stripped down, that is, the pressing pans are removed. Subsequently the Cellophane is stripped off the now completed rubber panels either by hand or by means of an air blast. The Cellophane comes off readily through the use of an air blast and leaves a very smooth, highly polished surface on the rubber material. The Cellophane can be used but once, as it is considerably weakened by the heat; but it is cheap enough to make the operation an economical one.

I prefer not to use the thinnest grade of Cellophane in my process because it has a greater tendency to wrinkle and presents greater difficulty in spreading it smoothly on the rubber sheet. Ordinarily, Cellophane is .0008 inch in thickness; but I prefer to use a grade of Cellophane between say .0013 inch to .0017 inch. This heavier film facilitates the handling of the material and the spreading of it onto the rubber.

Due to the pressures used, I find it necessary to calendar the rubber stock somewhat thicker than the required thickness of the finished sheet or panel. Thus to make a rubber stock $\frac{1}{16}$ of an inch or .0625 inch finished thickness, I calendar a rubber stock to approximately .075 inch in thickness. This material is compressed sufficiently in my process to make it come within the tolerance for 1/16 inch rubber sheets. In the light of these teachings it will be within the skill of the worker in the art to select the proper thickness for the calendared rubber and the proper stack thickness for any press operation.

Not only does the Cellophane or other regenerated cellulose give a superior finish but it holds the sheet rubber in the press and prevents it from squeezing out between the pressing pans. This is an exceedingly important function, since hitherto it has not been possible to make rubber panels under pressure in this way. If the rubber material were pressed against the steel plates without the Cellophane, it would be impossible to control the thickness of the stock, as much of the material would run out between the edges of the steel plates.

Moreover, the Cellophane or other regenerated cellulosic film material protects both the product and the pressing pans. Were it not for the Cellophane, the rubber would stick very tightly to the pressing pans and it would be impossible to strip away the thin rubber material without breaking it. Moreover, the surface of the pans would be damaged and the pans would be likely to be bent in a stripping operation. In my process there is no need to strip anything from the pans since nothing adheres to them; and it is very easy to strip the flexible Cellophane material from the cured rubber panel.

My process produces a panel or sheet stock having superior physical characteristics because it has been formed under compression, and also a much better surface than has consistently been possible heretofore. It produces fewer defective sheets, is very much cheaper to operate, and eliminates expensive portions of conventional equipment such as the tin mills.

Modifications may be made in my invention without departing from the spirit of it. Having thus described my invention, what I claim as new and desire to secure by Letters Patent is:

1. A process of producing cured rubber sheet stock which comprises compounding rubber, locating said rubber between pressure pans in a press and pressing and curing it under heat and pressure, while maintaining the rubber between said pans by locating on each side of the rubber against said pans a preformed sheet of regenerated cellulosic material.

2. A process of producing cured rubber sheet stock which comprises sheeting compounded rubber stock and forming a stack thereof by covering a pressure pan with a sheet of regenerated cellulosic material, superposing a sheet of rubber stock, covering the rubber stock with a preformed sheet of cellulosic material, superposing a pressure pan, and continuing these operations until a stack of desired thickness is built up, and pressing said stack in a press while applying heat thereto to cure said rubber stock.

3. A process of producing cured rubber sheet stock which comprises sheeting compounded rubber stock and forming a stack thereof by covering a pressure pan with a sheet of regenerated cellulosic material, superposing a sheet of rubber stock, covering the rubber stock with a preformed sheet of cellulosic material, superposing a pressure pan, and continuing these operations until a stack of desired thickness is built up, and pressing said stack in a press while applying heat thereto to cure said rubber stock, afterwards disassembling said stack and stripping the regenerated cellulosic material from the surfaces of the cured rubber sheet material.

4. A process of producing cured rubber sheet stock which comprises sheeting compounded rubber stock and forming a stack thereof by covering a pressure pan with a sheet of regenerated cellulosic material, superposing a sheet of rubber stock, covering the rubber stock with a preformed sheet of cellulosic material, superposing a pressure pan, and continuing these operations until a stack of desired thickness is built up, and pressing said stack in a press while applying heat thereto to cure said rubber stock, afterwards disassembling said stack and stripping the regenerated cellulosic material from the surfaces of the cured rubber sheet material by means of an air blast.

5. A process of producing a compressed, cured rubber sheet which comprises pressing a rubber stock against a smooth surfaced metallic member with a sheet of regenerated cellulosic material interposed between the rubber and said metallic member, and curing the rubber while so pressed undr heat.

EDWARD R. DILLEHAY.